(12) United States Patent
Wei

(10) Patent No.: US 10,437,380 B2
(45) Date of Patent: Oct. 8, 2019

(54) TOUCH SENSING PANEL

(71) Applicants: AU OPTRONICS (SUZHOU) CORP., LTD., Suzhou (CN); AU OPTRONICS CORPORATION, Hsin-chu (TW)

(72) Inventor: Guang-Dong Wei, Suzhou (CN)

(73) Assignees: AU OPTRONICS (SUZHOU) CORP., LTD., Suzhou (CN); AU OPTRONICS CORPORATION, Hsin-Chu (TW)

( * ) Notice: Subject to any disclaimer, the term of this patent is extended or adjusted under 35 U.S.C. 154(b) by 24 days.

(21) Appl. No.: 15/813,768

(22) Filed: Nov. 15, 2017

(65) Prior Publication Data

US 2018/0329566 A1 Nov. 15, 2018

(30) Foreign Application Priority Data

May 11, 2017 (CN) .......................... 2017 1 0329443

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04111* (2013.01)

(58) Field of Classification Search
CPC ................... G06F 3/0416; G06F 3/044; G06F 2203/04111
See application file for complete search history.

(56) References Cited

U.S. PATENT DOCUMENTS

| 2004/0252109 | A1 | 12/2004 | Trent, Jr. et al. |
| 2009/0273573 | A1 | 11/2009 | Hotelling |
| 2011/0031041 | A1 | 2/2011 | Bulea et al. |
| 2015/0234527 | A1* | 8/2015 | Roberts ................. G06F 3/0416 345/174 |
| 2015/0242028 | A1* | 8/2015 | Roberts ................. G06F 3/0416 345/173 |

FOREIGN PATENT DOCUMENTS

| CN | 103207717 A | 7/2013 |
| CN | 204631838 U | 9/2015 |
| CN | 106227382 A | 12/2016 |

* cited by examiner

*Primary Examiner* — Jonathan A Boyd
(74) *Attorney, Agent, or Firm* — Tim Tingkang Xia, Esq.; Locke Lord LLP

(57) ABSTRACT

A touch sensing panel includes a substrate, first curved circuits, an insulation layer, and second curved circuits. The substrate includes a central region, a peripheral region surrounding the central region, and a touch-sensing circuit region between the central region and the peripheral region. The first curved circuits and the second curved circuits are disposed on the substrate and separately extended from the peripheral region to the central region. One end of each first curved circuit disposed in the peripheral region is electrically connected to one end of each second curved circuit disposed in the peripheral region. In the touch-sensing circuit region, a projection of each second curved circuit in a direction perpendicular to the substrate is intersected with at least one of the first curved circuits. The insulation layer is disposed on the substrate and insulates the first curved circuits and the second curved circuits in the touch-sensing circuit region.

14 Claims, 16 Drawing Sheets

TOUCH SENSING PANEL

CROSS-REFERENCE TO RELATED PATENT APPLICATION

This application claims priority to and the benefit of, pursuant to 35 U.S.C. § 119(a), patent application Serial No. 201710329443.9 filed in China on May 11, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a touch sensing panel, and in particular, to a touch sensing panel with no bezel or with a narrow bezel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, a control chip of a common touch sensing panel with a non-rectangular outline, especially a touch sensing panel with a circle outline or an elliptical outline, needs to receive a complex sensing signal or perform a large amount of calculation, to precisely locate an actual position at which a user touches the touch sensing panel. However, with development of portable touch sensing display apparatuses such as smartphones and intelligent watches, an overall weight is reduced to satisfy a lightness and thinness trend. Especially, the weight of the battery is reduced, and capacity of the battery is also reduced. Therefore, after supplying power to a display component, the battery cannot supply much power to the control chip for complex positioning calculation. Therefore, it is expected to reduce positioning calculation complexity of many touch sensing panels, so as to reduce power required by a user to touch the position, and improve positioning preciseness. However, such an expectation usually cannot be achieved due to various limitations. For example, for some non-rectangular touch sensing panels, rectangular grids are formed still by using sensing electrodes and drive electrodes that are intersected in an X-Y direction, and a touch position of a user is positioned by using the rectangular grids. However, an incomplete rectangular grid may exist on an edge of a touch sensing panel, and a relatively complex electrical signal change may correspondingly occur. Consequently, calculation complexity is increased. Further, more calculation resources and power are consumed. Alternatively, for some touch sensing panels, the surface of the touch sensing panel may be divided into a plurality of small units, and each small unit is provided with an independent sensor. However, a drive design of such a touch sensing panel is relatively complex, and due to limitations of the capability and power consumption of a drive chip, the touch sensing panel cannot be widely applied. Alternatively, some touch sensing panels are provided with sensing electrodes arranged in concentric circles and radial drive electrodes. However, in such a touch sensing panel, some electrodes close to the center of the touch sensing panel are too dense, and in addition to an inter-electrode interaction effect, multiple signal changes may occur. Consequently, it is difficult for the control chip to perform determining.

It can be seen that the foregoing existing architecture obviously has inconvenience and disadvantages, and needs to be further improved. To resolve the foregoing problem, persons in related fields are trying their best to find the solution, but for a long time, a proper manner is still not found. Therefore, how to effectively resolve the foregoing problem is currently an important research subject, and should also become a target for the related field now.

SUMMARY

A technical aspect of the present invention relates to a touch sensing panel, which is used to resolve the foregoing problem mentioned in the related art.

One or more implementations of the present invention provide a touch sensing panel. The touch sensing panel includes a substrate, a plurality of first curved circuits, an insulation layer, and a plurality of second curved circuits. The substrate includes: a central region, a peripheral region, and a touch-sensing circuit region. The peripheral region surrounds the central region. The touch-sensing circuit region is between the central region and the peripheral region. The first curved circuits are disposed on the substrate. Each first curved circuit has a first end and a second end. The first end is disposed in the touch-sensing circuit region, and is adjacent to the central region. The second end is disposed in the peripheral region. A part of the first curved circuit that is extended between the first end and the second end is in the touch-sensing circuit region. The second curved circuits are disposed on the substrate. Each second curved circuit has a third end and a fourth end. The third end is disposed in the touch-sensing circuit region, and is adjacent to the central region. The fourth end is disposed in the peripheral region, and is electrically connected to one of the second ends in the peripheral region. A part of the second curved circuit that is extended between the third end and the fourth end is in the touch-sensing circuit region. A projection of each second curved circuit in a direction perpendicular to the substrate is intersected with at least one of the first curved circuits. The insulation layer is disposed on the substrate and insulates the first curved circuits and the second curved circuits in the touch-sensing circuit region.

In one or more implementations of the present invention, the insulation layer is also disposed in the peripheral region. The first curved circuits and the second curved circuits are respectively disposed on two opposite sides of the insulation layer. The insulation layer has a plurality of through holes disposed in the peripheral region. The second curved circuits are respectively electrically connected to the first curved circuits through the through holes.

In one or more implementations of the present invention, projections of the second end and the fourth end that are electrically connected through one of the through holes are overlapped in the direction perpendicular to the substrate.

In one or more implementations of the present invention, each of the first curved circuits has a plurality of first parts and a plurality of second parts. The first parts and the second curved circuits are disposed on one side of the insulation layer, and are not in contact with each other. The second parts are disposed on the other side of the insulation layer, and are respectively connected to the corresponding first parts through the insulation layer in the touch-sensing circuit region. The second parts are in a joint between projections of the first curved circuits and the second curved circuits in the direction perpendicular to the substrate.

In one or more implementations of the present invention, shapes of the first curved circuits and the second curved circuits may include one or a combination of an arc shape, an elliptical arc shape, and a part of a Reuleaux polygon.

In one or more implementations of the present invention, outlines of the first curved circuits and the second curved circuits are essentially a part of a Reuleaux triangle, a Reuleaux pentagon, a Reuleaux heptagon, or a Reuleaux nonagon.

In one or more implementations of the present invention, shapes of the first curved circuits and the second curved circuits may separately include one of an arc shape, an elliptical arc shape, and a part of a Reuleaux polygon.

In one or more implementations of the present invention, one of the first curved circuits and one of the second curved circuits that are electrically connected are of a mirror symmetrical structure.

In one or more implementations of the present invention, shapes of the first curved circuits or shapes of the second curved circuits may be the same, partly the same, or different.

In one or more implementations of the present invention, lengths of the first curved circuits and lengths of the second curved circuits may be the same, partly the same, or different.

In one or more implementations of the present invention, the touch sensing circuit substrate may further include a first ring electrode. The first ring electrode is disposed in the peripheral region, and is electrically connected to the second ends and the fourth ends.

In one or more implementations of the present invention, the touch sensing circuit substrate may further include a second ring electrode. The second ring electrode is disposed in the central region, and is electrically connected to the first ends and the third ends.

In one or more implementations of the present invention, materials of the first curved circuits or the second curved circuits are transparent conductive materials.

In one or more implementations of the present invention, materials of the first curved circuits and the second curved circuits may be the same, partly the same, or different.

In one or more implementations of the present invention, the curvature radius of the circumcircle of the first curved circuits is less than or equal to one half of the curvature radius of the peripheral region, and the curvature radius of the circumcircle of the second curved circuits is less than or equal to one half of the curvature radius of the peripheral region.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

A plurality of implementations of the present invention is disclosed below by using the accompanying drawings. For clear description, many details are described in the following descriptions. However, it should be understood that these details are not intended to limit the present invention. That is, in some implementations of the present invention, these details are not necessary. In addition, to simplify the accompanying drawings, some known structures and components are shown in the accompanying drawings in a simple schematic manner.

Figure 1:
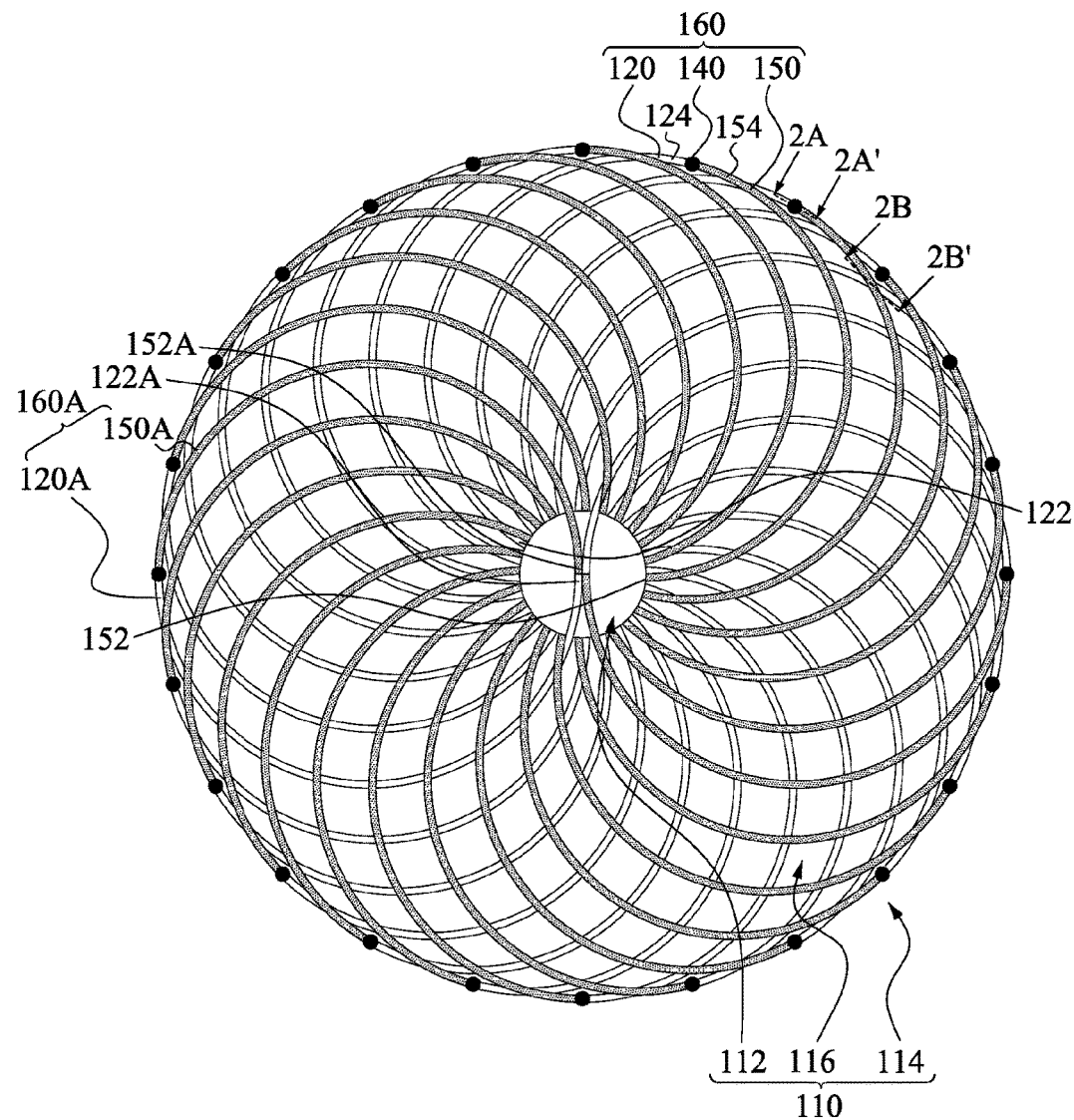
FIG. 1 is a top view of a touch sensing panel according to an implementation of the present invention.
Figure 2A:
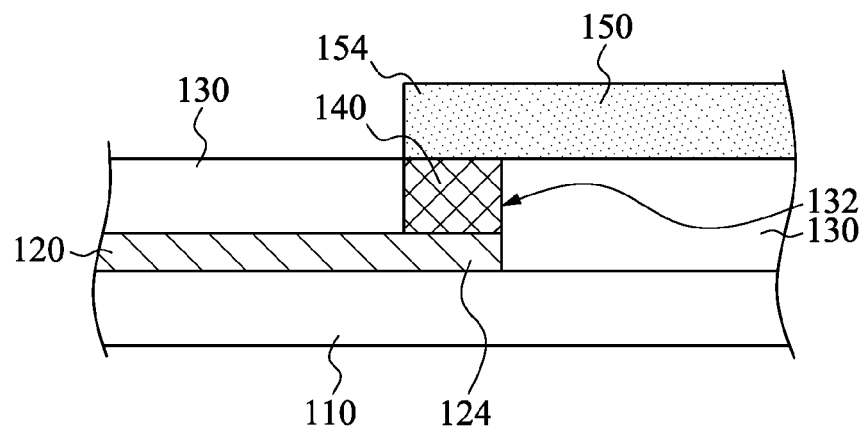
FIG. 2A and FIG. 2B are each a cross-sectional view of a touch sensing panel according to a line segment 2A-2A' and a line segment 2B-2B' in FIG. 1.
Figure 2B:
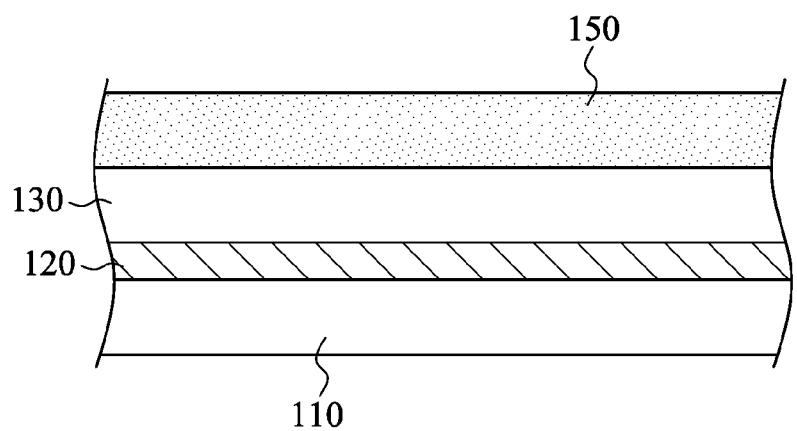

FIG. 1 is a top view of a touch sensing panel 100 according to an implementation of the present invention. Circuits without grids represent first curved circuits 120, and circuits with grids represent second curved circuits 150. FIG. 2A and FIG. 2B are each a cross-sectional view of the touch sensing panel 100 according to a line segment 2A-2A' and a line segment 2B-2B' in FIG. 1. As shown in FIG. 1 and FIG. 2A, the touch sensing panel 100 includes a substrate 110, first curved circuits 120, an insulation layer 130, and second curved circuits 150. The substrate 110 has a central region 112, a peripheral region 114, and a touch-sensing circuit region 116. The peripheral region 114 surrounds the central region 112. The touch-sensing circuit region 116 is between the central region 112 and the peripheral region 114. In this implementation, an outline of the substrate 110 is a circle, but is not limited thereto. For example, the outline of the substrate 110 may alternatively be an ellipse, a star, or other non-rectangular shapes.

Still referring to FIG. 1 and FIG. 2A, in this implementation, the first curved circuits 120 are disposed on the substrate 110. The first curved circuit 120 has a first end 122 and a second end 124. The first end 122 is an end of the first curved circuit 120 and is disposed adjacent to the central region 112. The second end 124 is an end of the first curved circuit 120 and is disposed adjacent to the peripheral region 114. A part of the first curved circuit 120 that is extended between the first end 122 and the second end 124 is in the touch-sensing circuit region 116. The insulation layer 130 is disposed on the substrate 110, and covers the first curved circuits 120. The insulation layer 130 has through holes 132 and conduction paths 140 disposed in the through holes 132. The second curved circuits 150 are disposed on the insulation layer 130. The second curved circuit 150 has a third end 152 and a fourth end 154. The third end 152 is an end of the second curved circuit 150 and is disposed adjacent to the central region 112. The fourth end 154 is an end of the second curved circuits 150, is disposed in the peripheral region 114, and is electrically connected to the second end 124 of one of the first curved circuits 120 in the peripheral region 114. A part of the second curved circuit 150 that is extended between the third end 152 and the fourth end 154 is in the touch-sensing circuit region 116. A projection of each second curved circuit 150 in a direction perpendicular to the substrate 110 is intersected with at least one of the first curved circuits 120. In multiple implementations, shapes of the first curved circuits 120 and the second curved circuits 150 may be a part of a circle.

Referring to FIG. 2A, in this implementation, the first curved circuits 120 may be electrically connected to the second curved circuits 150 through the through holes 132. More specifically, the first curved circuits 120 are electrically connected, by using the second ends 124, to the conduction paths 140 formed in the through holes 132. Further, the first curved circuits 120 are electrically connected to the fourth ends 154 of the second curved circuits 150 by using the conduction paths 140, so that the first curved circuits 120 and the second curved circuits 150 form arc circuit groups 160. As shown in FIG. 2B, if there is no through hole 132 above the touch-sensing circuit region 116 of the substrate 110, the insulation layer 130 is between the first curved circuits 120 and the second curved circuits 150. That is, the first curved circuits 120 and the second curved circuits 150 are respectively disposed on two opposite sides of the insulation layer 130. In the touch sensing panel 100, in the position provided with no through hole 132, for example, the touch-sensing circuit region 116, the first curved circuits 120 and the second curved circuits 150 are intersected with each other, and generate inductance, to change with touches of a user during electrical signal transmission. In addition, the insulation layer 130 insulates the first curved circuits 120 and the second curved circuits 150, to avoid electrical contacts between the first curved circuits 120 and the second curved circuits 150 in a position other than the through holes 132, thereby further reducing impact on the electrical signal transmission. In other words, the first curved circuits 120 are not intersected with each other. The second curved circuits 150 are not intersected with each other. An arc circuit group 160 is electrically conducted inside, and the arc circuit groups 160 are electrically insulated from each other.

Figure 3A:
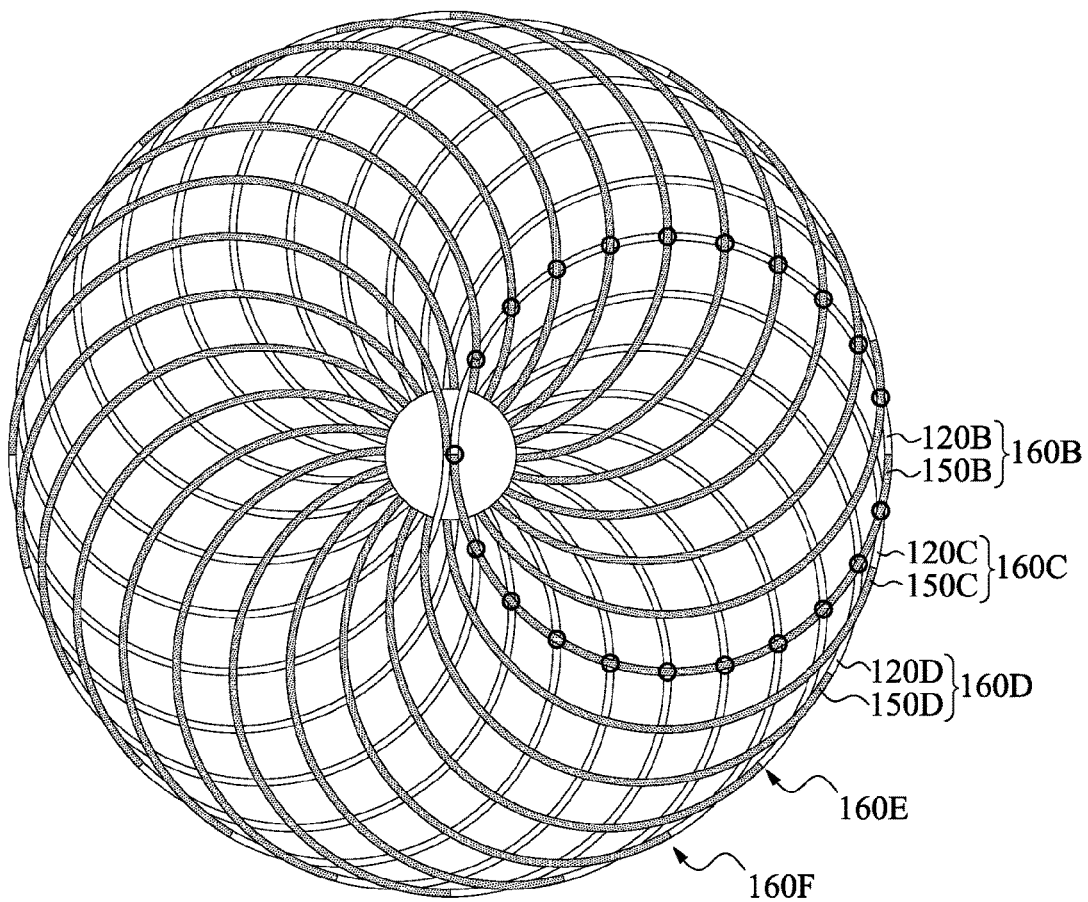
FIG. 3A to FIG. 3C are schematic diagrams in which a touch sensing panel sends a scanning signal to first curved circuits and second curved circuits in arc circuit groups in different time sequences according to multiple implementations of the present invention.
Figure 3B:
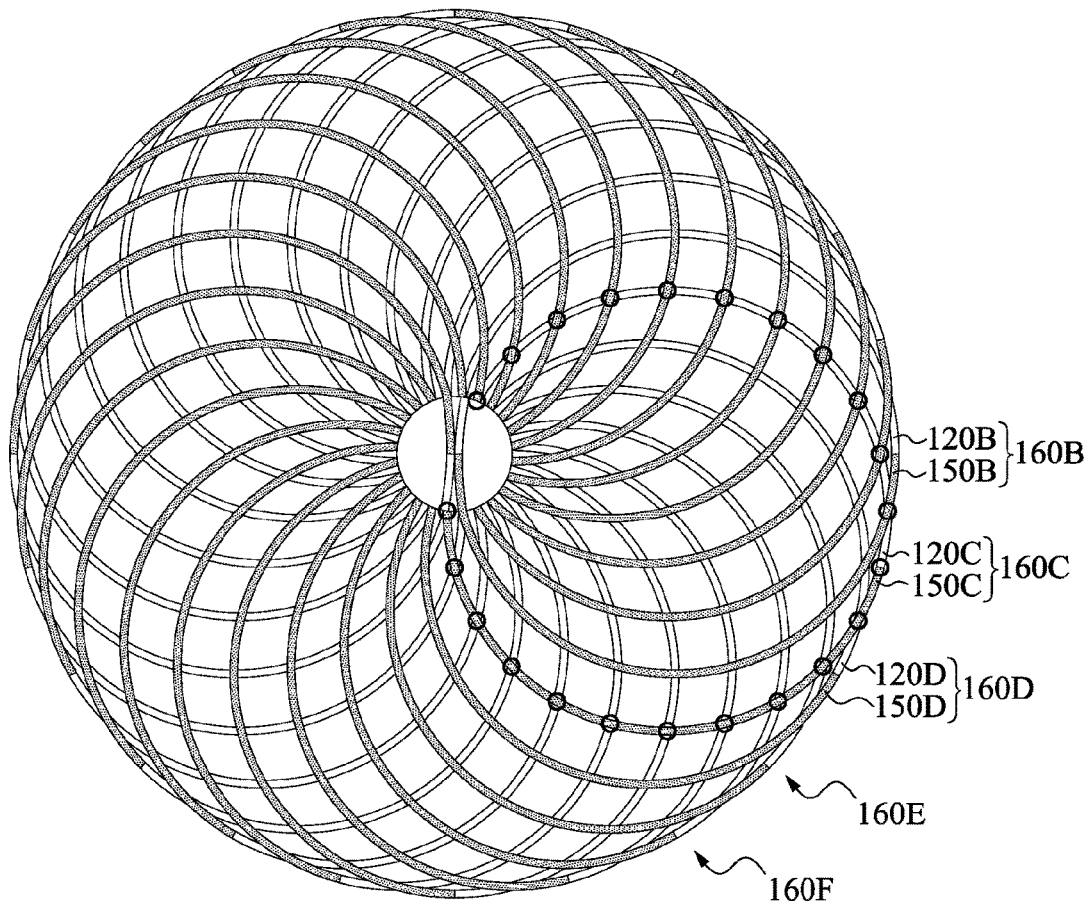
Figure 3C:
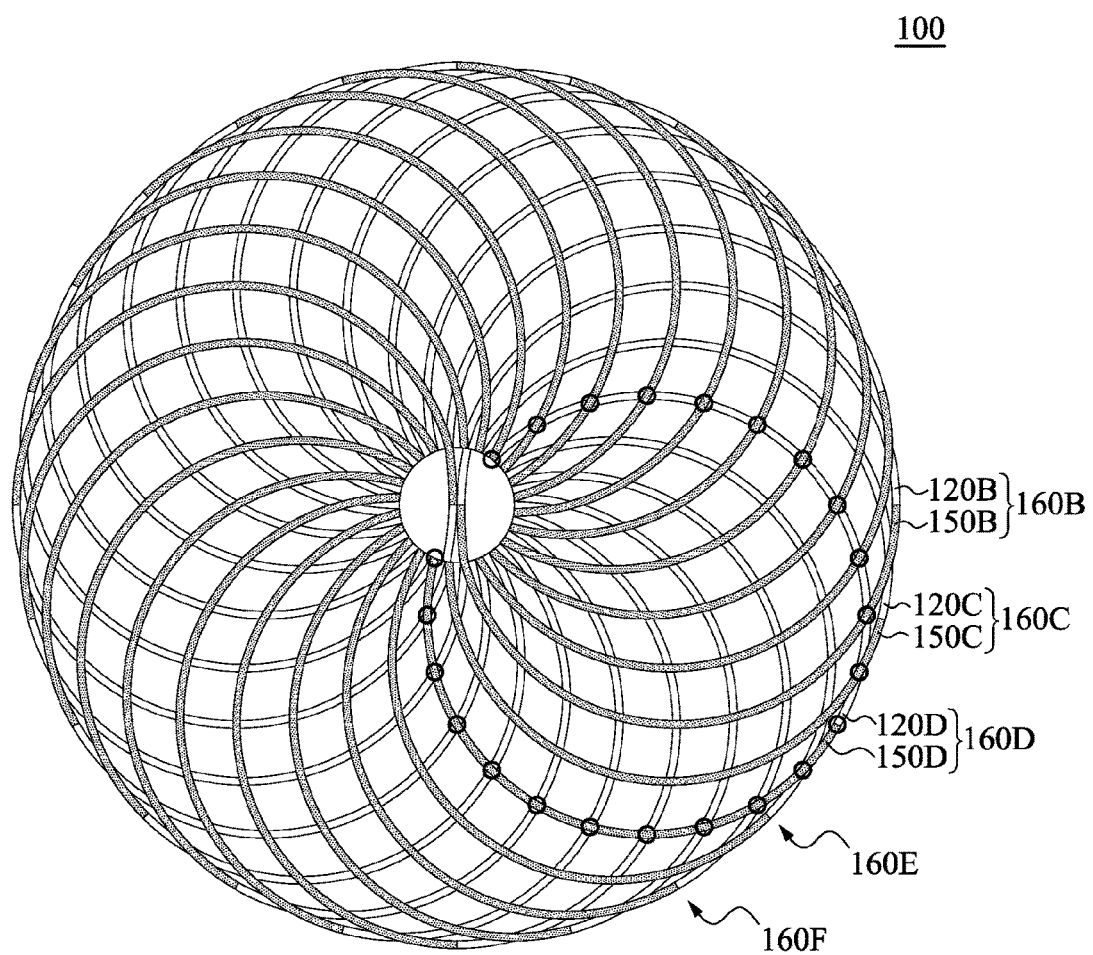

FIG. 3A to FIG. 3C are schematic diagrams showing that a touch sensing panel 100 sends a scanning signal to first curved circuits 120 and second curved circuits 150 in arc circuit groups 160 in different time sequences according to multiple implementations of the present invention. Overlapped parts that are between the first curved circuits 120 and the second curved circuits 150 and that are circled by empty circles represent transmission paths of the scanning signal. As shown in FIG. 3A, the scanning signal enters the first curved circuits 120 and the second curved circuits 150 that are electrically connected in the arc circuit groups 160. In multiple implementations, a control module (not shown in the figure) may send the scanning signal in different time sequences by using one of the arc circuit groups 160, and receive a sensing signal by using the remaining arc circuit groups 160, to drive the touch sensing panel 100. For example, after entering an arc circuit group 160B, the scanning signal sent by the control module is further transmitted along a first curved circuit 120B and a second curved circuit 150B. In addition, other arc circuit groups 160, for example, an arc circuit group 160C, an arc circuit group 160D, an arc circuit group 160E, and an arc circuit group 160F, that are intersected with the arc circuit group 160B of a transmission path of the scanning signal are used as transmission paths of the sensing signal. More specifically, the scanning signal may be transmitted to the touch sensing panel 100 along the arc first curved circuit 120B and the second curved circuit 150B, and the sensing signal may be received by using the remaining arc circuit groups 160 that are intersected with the arc circuit group 160B in the touch sensing panel 100.

Arc circuits, for example, the first curved circuits 120 and the second curved circuits 150 in FIG. 1 may be better distributed on the substrate 110 more efficiently. In addition, in the touch-sensing circuit region 116, an area of a region circled by each first curved circuit 120 and each second curved circuit 150 periodically changes along a radial direction of the substrate 110. Further, an electrical signal of the touch sensing panel 100 that changes with a touch of a user is enabled to be more predictable. For example, when the user touches any position in the touch-sensing circuit region 116, an electrical feature change (for example, a capacitance change) generated by a first curved circuit 120 and a second curved circuit 150 that are adjacent to the touch position may also be better predicted. In this way, when the touch of the user changes an electrical feature of the arc circuit groups 160 adjacent to the touch position and the sensing signal passing through the arc circuit groups 160, the control chip may relatively easily calculate related information, such as a position and strength, about the touch of the user on the touch sensing panel 100 by using the changed sensing signal, and reduce, when the sensing signal changes with the touch of the user, a calculation amount that is required to calculate the touch position of the user (for details, refer to the calculation method in FIG. 4, but the present invention is not limited thereto). Therefore, configuration of the arc circuit groups 160 of the touch sensing panel 100 may reduce a response time of the touch sensing panel 100 and calculation resources that are required for response. A use amount of the calculation resources may even be better reduced when the user performs multi-touch on the touch sensing panel 100.

In addition, because in the touch sensing panel 100 in this disclosure, the sensing signal is separately received by using the remaining arc circuit groups 160 that are intersected with the arc circuit group 160 for receiving the scanning signal, utilization of the arc circuit groups 160 may be improved, and density and preciseness of sensing of the touch sensing panel 100 may be increased. Moreover, sensing of multi-touch may further be implemented.

As shown in FIG. 3B, in another time sequence, the control module sends the scanning signal to another arc circuit group 160, for example, the arc circuit group 160C. The scanning signal is transmitted in the first curved circuit 120C and the second curved circuit 150C. Similarly, other arc circuit groups 160, for example, the arc circuit group 160B, the arc circuit group 160D, the arc circuit group 160E, and the arc circuit group 160F, that are intersected with the first curved circuit 120C and the second curved circuit 150C that are used to transmit the scanning signal are used as transmission paths of the sensing signal. Subsequently, as shown in FIG. 3C, in another time sequence, the control module sends the scanning signal to another arc circuit group 160D. The scanning signal is transmitted in the first curved circuit 120D and the second curved circuit 150D. Similarly, other arc circuit groups 160 that are intersected with the first curved circuit 120C and the second curved circuit 150C that are used to transmit the scanning signal are used as transmission paths of the sensing signal.

It should be noted that the transmission manner for the scanning signal and the transmission mode in different time sequences that are described herein are merely examples, and are not intended to limit the present invention. In some implementations, the control module counterclockwise sequentially sends the scanning signal to different arc circuit groups 160. In other multiple implementations, the control module sequentially sends the scanning signal to arc circuit groups 160 that are spaced away from each other. It should be learned that a person of ordinary skill in the technical field of the present invention may make proper modifications and replacements according to an actual need, without departing from the spirit and scope of this disclosure, provided that the scanning signal can be transmitted by using the arc circuit group 160, and received by the remaining arc circuit groups 160 that are intersected with the arc circuit group 160.

Figure 4:
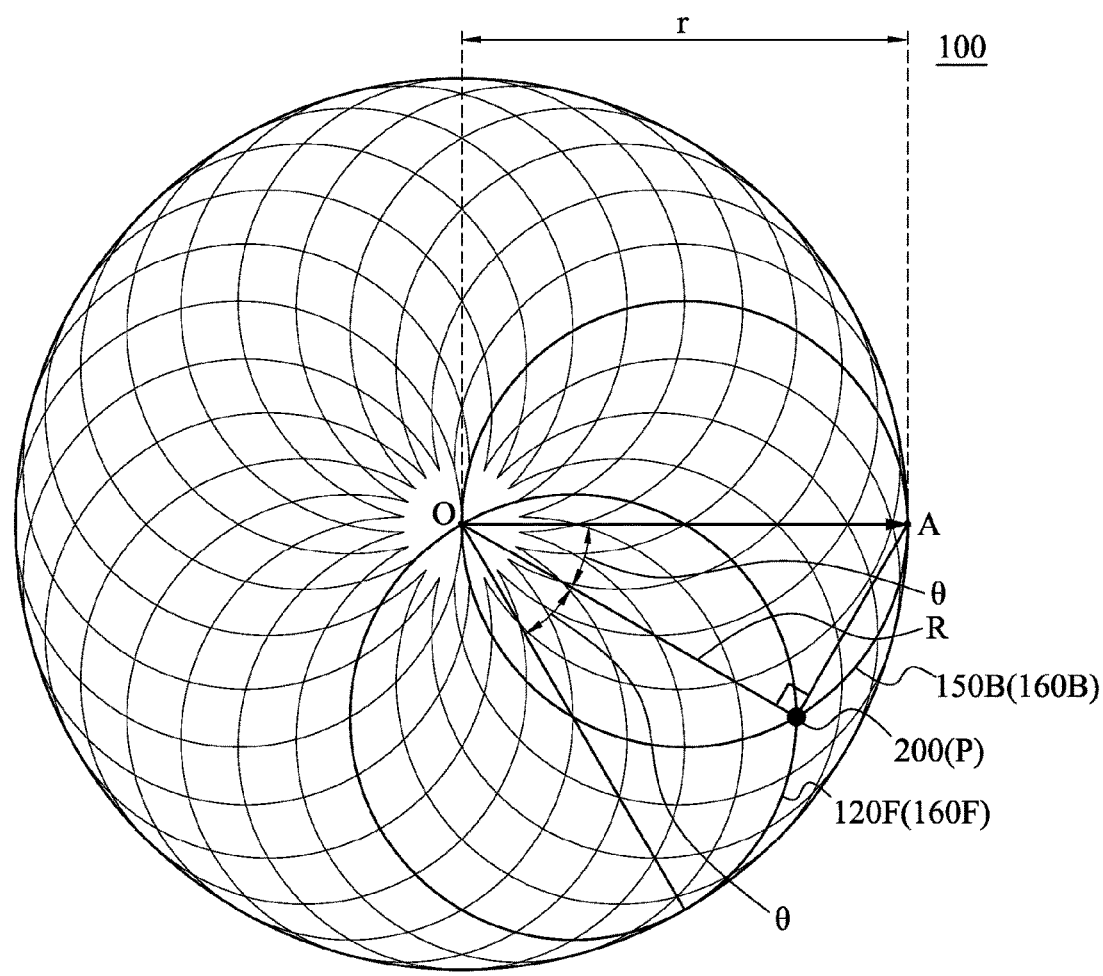
FIG. 4 is a schematic diagram of calculating a touch position of a user when the user touches a touch sensing contact point on the touch sensing panel according to FIG. 1.

FIG. 4 is a schematic diagram of calculating a touch position of a user when the user touches a touch sensing contact point 200 on the touch sensing panel 100 according to FIG. 1. As shown in FIG. 4, when the scanning signal is transmitted in the arc circuit groups 160, and the user touches the contact point 200, for example, the scanning signal is shown in FIG. 3A, and is transmitted in the first curved circuit 120B and the second curved circuit 150B in the arc circuit group 160B. The contact point 200 is essentially adjacent to a joint between the arc circuit group 160B and the arc circuit group 160F, and an electrical feature of the arc circuit group 160F, for example, capacitance, changes with a touch of the user. In this way, a sensing signal that is received by using the arc circuit group 160F is different from a sensing signal that is received by using another arc circuit group 160 due to an electrical feature change. Further, an actual position of the contact point 200 on the touch sensing panel 100 may be located by using the arc circuit group 160B that is used to transmit the scanning signal and the arc circuit group 160F in which the sensing signal relatively fiercely changes. For a positioning method, refer to the following description, and details are not described herein.

Referring to FIG. 3A and FIG. 4, in this implementation, for example, the position of the touch sensing panel 100 may be converted into polar coordinates, that is, a moving point P (including the contact point 200 touched by the user) on the touch sensing panel 100 may be expressed as P=(R, θ) in a manner of polar coordinates, where R represents a distance R between the moving point P and an origin O of the polar coordinates. The origin O is at the very center of the central region 112 (referring to FIG. 1). Θ represents an included angle between a line from the moving point P to the origin O and a line. Using the clockwise direction as the positive direction, for example, it may be an included angle θ between a line segment OP and a line segment OA. Using FIG. 3A and FIG. 4 as an example, the touch sensing panel 100 has 24 arc circuit groups 160 in total. There are 3 arc circuit groups 160 between the arc circuit group 160B used as a drive electrode (Tx) for transmitting the scanning signal and the arc circuit group 160F used as a sensing electrode (Rx) for receiving the sensing signal. 2θ=2π4/24, that is, θ=π/6 or 30. R is the length of the line segment OP=the length of the line segment OA·cos (θ), and R=(¾) ½·r. That is, the polar coordinates of the contact point 200 on the touch sensing panel 100 may be ((¾) ½r, π/6). Further, if m is used to represent a total quantity of arc circuit groups 160 on the touch sensing panel 100, nTx is a number of the arc circuit group used to transmit the scanning signal, nRx is a number of the arc circuit group used to receive the changed sensing signal, nTx and nRx range from 1 to m, and nRx is not equal to nTx, any moving point P may be converted into polar coordinates for representation. In this case, the polar coordinates of the moving point P are (r·cos {(nRx−nTx)/[2·(2π/m)]}, π−(2π/m)[m/2−(nRx−nTx)]). In other multiple implementations, for example, coordinates of the moving point P may be represented in a rectangular coordinate system.

The touch sensing panel 100 may locate the contact point 200 in a manner of polar coordinates due to the distribution manner of the arc circuit groups 160 on the touch sensing panel 100. Calculation complexity is low compared with the manner of rectangular coordinates used on the touch sensing panel 100. In this way, calculation resources required in positioning may be reduced. Further, a calculation amount and a calculation time that are required by the control chip are reduced. In addition, when the quantity of the arc circuit groups 160 on the touch sensing panel 100 is increased or reduced, the value of m may be directly changed in calculation, and the calculation complexity is not changed. That is, when the quantity of the arc circuit groups 160 is increased or reduced, calculation load is not increased.

Referring to FIG. 1, in this implementation, the curvature radius of the first curved circuits 120 and the curvature radius of the second curved circuits 150 are essentially the same. In multiple implementations, the curvature radius of the circumcircle of the first curved circuits 120 and the curvature radius of the circumcircle of the second curved circuits 150 is less than or equal to one half of the curvature radius of the peripheral region 114, but the present invention is not limited thereto. In this implementation, the first curved circuits 120 and the second curved circuits 150 in some arc circuit groups 160 may be extended to the central region 112. For example, a first end 122A of a first curved circuit 120A and a third end 152A of a second curved circuit 150A in an arc circuit group 160A are extended to the central region 112, to sense a touch position of the user in the central region 112. It should be noted that the first end 122A and the third end 152A are essentially on two sides of the insulation layer 130, and are not essentially electrically connected. In this implementation, lengths of a first curved circuit 120 and a second curved circuit 150 in a same arc circuit group 160 are essentially the same. For example, the length of the first curved circuit 120B and the length of the second curved circuit 150B are essentially the same (referring to FIG. 3A). For example, the length of the first curved circuit 120C and the length of the second curved circuit 150C are essentially the same (referring to FIG. 3A). Furthermore, curvature radiuses of a first curved circuit 120 and a second curved circuit 150 in a same arc circuit group 160 are essentially the same, and the lengths are also essentially the same. Therefore, the first curved circuit 120 and the second curved circuit 150 that are electrically connected through a same through hole 132 (referring to FIG. 2A) may be of a mirror symmetrical structure. A sensing signal change of the first curved circuit 120 and the second curved circuit 150 that are of a symmetrical structure is relatively regular, and the control chip may relatively easily obtain information such as a touch point of the user.

Referring to FIG. 2A, in this implementation, projections of the second end 124 and the fourth end 154 that are electrically connected through a through hole 132 may be overlapped in a direction perpendicular to the substrate 110, but the present invention is not limited thereto. For example, in other multiple implementations, the through holes 132 may be extended between two surfaces provided with the first curved circuits 120 and the second curved circuits 150 in a direction other than the direction perpendicular to the substrate 110, and separately electrically connected to the second ends 124 and the fourth ends 154. It should be learned that a person of ordinary skill in the technical field of the present invention may make proper modifications and replacements according to an actual need, without departing from the spirit and scope of this disclosure, provided that the first curved circuits 120 can be electrically connected to the second curved circuits 150 through the through holes 132.

In multiple implementations, the first curved circuits 120 and the second curved circuits 150 may be made from a transparent conductive material, for example, at least one of transparent metal oxide materials such as indium tin oxide (ITO), indium zinc oxide (IZO), aluminum-doped zinc oxide (AZO), aluminum oxide hydroxide (AIO), indium oxide (InO), and gallium oxide (GaO); or other transparent conductive materials such as a carbon nano tube, silver nanoparticles, a metal or a compound metal (a metal film) whose thickness is less than 60 nanometers (nm), and an organic transparent conductive material. In multiple implementations, materials of the first curved circuits 120 and the second curved circuits 150 may be the same, partly the same, or different.

Figure 5:
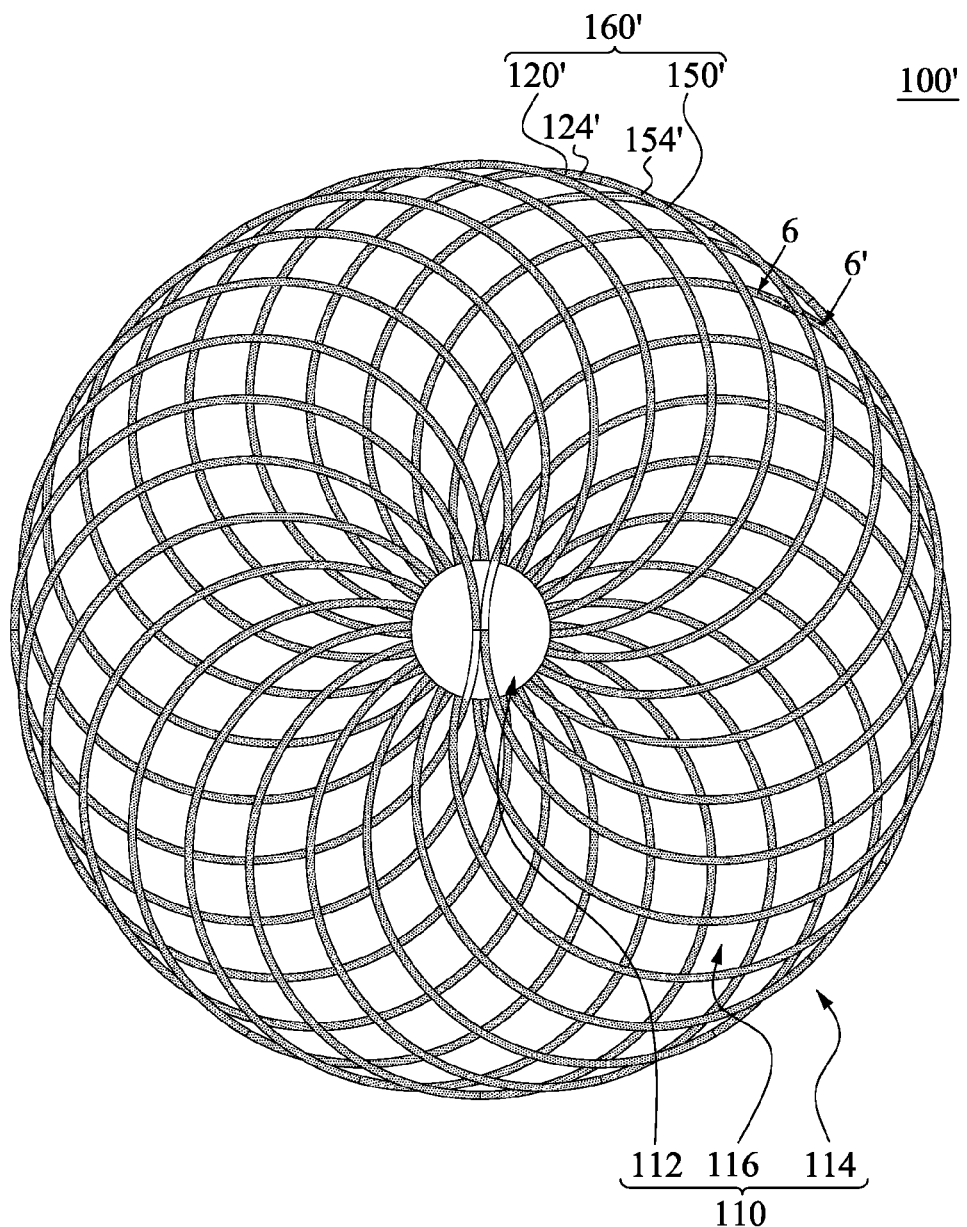
FIG. 5 is a schematic top view of a touch sensing panel according to another implementation of the present invention.
Figure 6:
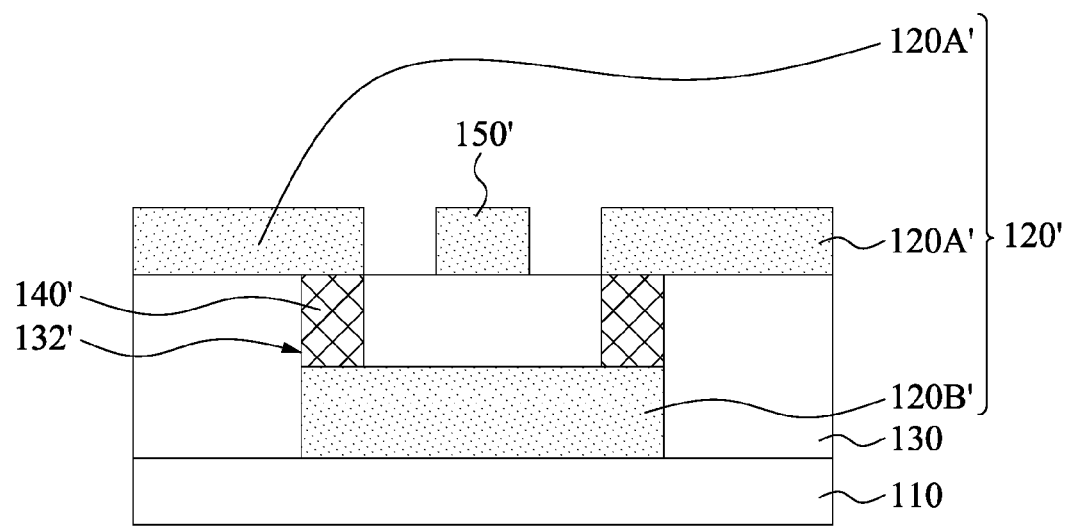
FIG. 6 is a cross-sectional view of a touch sensing panel according to a line segment 6-6' in FIG. 5.

FIG. 5 is a schematic top view of a touch sensing panel 100' according to another implementation of the present invention. FIG. 6 is a cross-sectional view of the touch sensing panel 100' according to a line segment 6-6' in FIG. 5. Referring to FIG. 5 and FIG. 6, in multiple implementations, at least part of first curved circuits 120', for example, first parts 120A' that are not overlapped with second curved circuits 150 in a vertical projection of a substrate 110, may be disposed on an insulation layer 130. Second parts 120B' that are in the first curved circuits 120' and that are overlapped with the second curved circuits 150 in the vertical projection of the substrate 110 are disposed on the other side of the insulation layer 130, for example, the side close to the substrate 110, and are electrically connected to corresponding first parts 120A' by using conductive features set in through holes 132' on the insulation layer 130, for example, conduction paths 140', but the present invention is not limited thereto. For example, the first curved circuits 120' may be electrically connected between two first parts 120A' by using another conductive feature. For example, the first parts 120A' of the first curved circuits 120' and the second curved circuits 150 may be on the side that is of the insulation layer 130 and that is close to the substrate 110, and the second parts 120B' are on the insulation layer 130, and are connected between two corresponding first parts 120A'. In other words, the first curved circuits 120' have a plurality of first parts 120A' and at least one second part 120B'. The first parts 120A' and the second curved circuits 150 are disposed on one side of the insulation layer 130, and are not in contact with each other. The second parts 120B' are disposed on the other side of the insulation layer 130, and are respectively connected to the corresponding first parts 120A' through the insulation layer 130 in a touch-sensing circuit region 116. The second parts 120B' are in a joint between projections of the first curved circuits 120' and the second curved circuits 150 in the direction perpendicular to the substrate 110.

In this implementation, the first parts 120A' of the first curved circuits 120' and the second curved circuits 150 are on the same side of the insulation layer 130. Therefore, the second ends 124' and the fourth ends 154' in a peripheral region 114 may be directly electrically connected on the insulation layer 130. Some first curved circuits 120' in the touch-sensing circuit region 116 are intersected with the second curved circuits 150. The insulation layer 130 still insulates the first curved circuits 120' and the second curved circuits 150, and generates inductance, to change with a touch of a user in transmission of an electrical signal.

Figure 7:
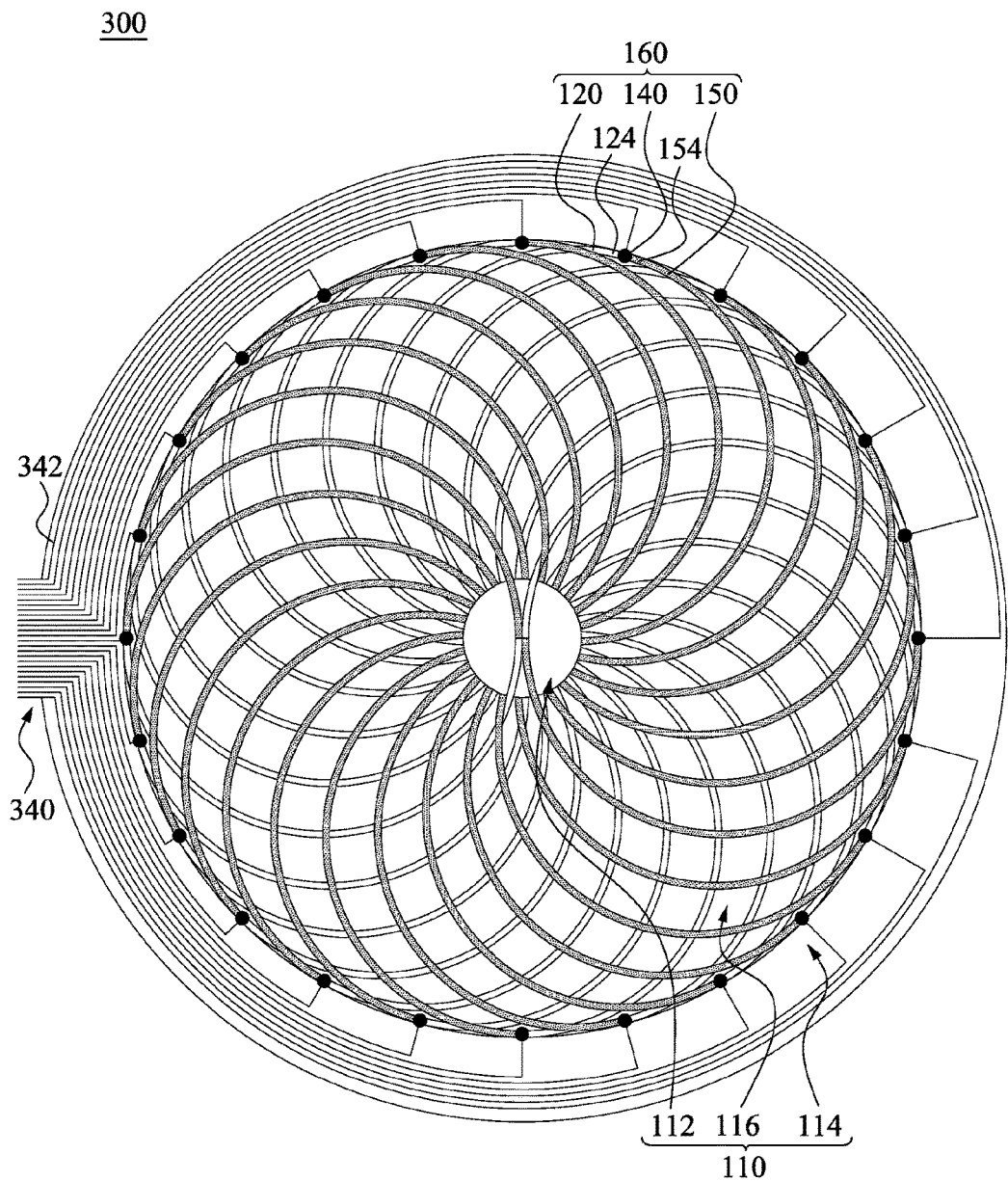
FIG. 7 is a schematic top view of a touch sensing panel according to another implementation of the present invention.

FIG. 7 is a schematic top view of a touch sensing panel 300 according to another implementation of the present invention. As shown in FIG. 7, in multiple implementations, the touch sensing panel 300 may further include a first ring electrode 340. The first ring electrode 340 is disposed in a peripheral region 114 of a substrate 110, and is electrically connected to arc circuit groups 160. More specifically, the first ring electrode 340 further includes a plurality of lines 342, and the lines 342 are respectively electrically connected to the arc circuit groups 160. In multiple implementations, the lines 342 may be electrically connected to at least one of second ends 124 of the arc circuit groups 160, fourth ends 154 of the arc circuit groups 160, or conduction paths 140 in through holes 132 (referring to FIG. 2A), to transmit a scanning signal or receive a sensing signal by using the arc circuit groups 160.

In the touch sensing panel 300, the first curved circuits 120, the second curved circuits 150, and/or the conduction paths 140 in the through holes 132 (referring to FIG. 2A) may be connected to the first ring electrode 340, so that the arc circuit groups 160 may further be connected to another electronic element by using the first ring electrode 340 (the lines 342). In addition, the first ring electrode 340 may directly connect the arc circuit groups 160 to the lines 342 from the outside peripheral region 114 due to a mode of the arc circuit groups 160, to reduce design complexity of the lines. In addition, the first ring electrode 340 may further centralize the lines 342 connected to the outside on a same side of the touch sensing panel 300, so that a control module can be more easily electrically connected to the lines 342 of the touch sensing panel 300, so as to simplify a design of the lines of the touch sensing panel 300.

Figure 8:
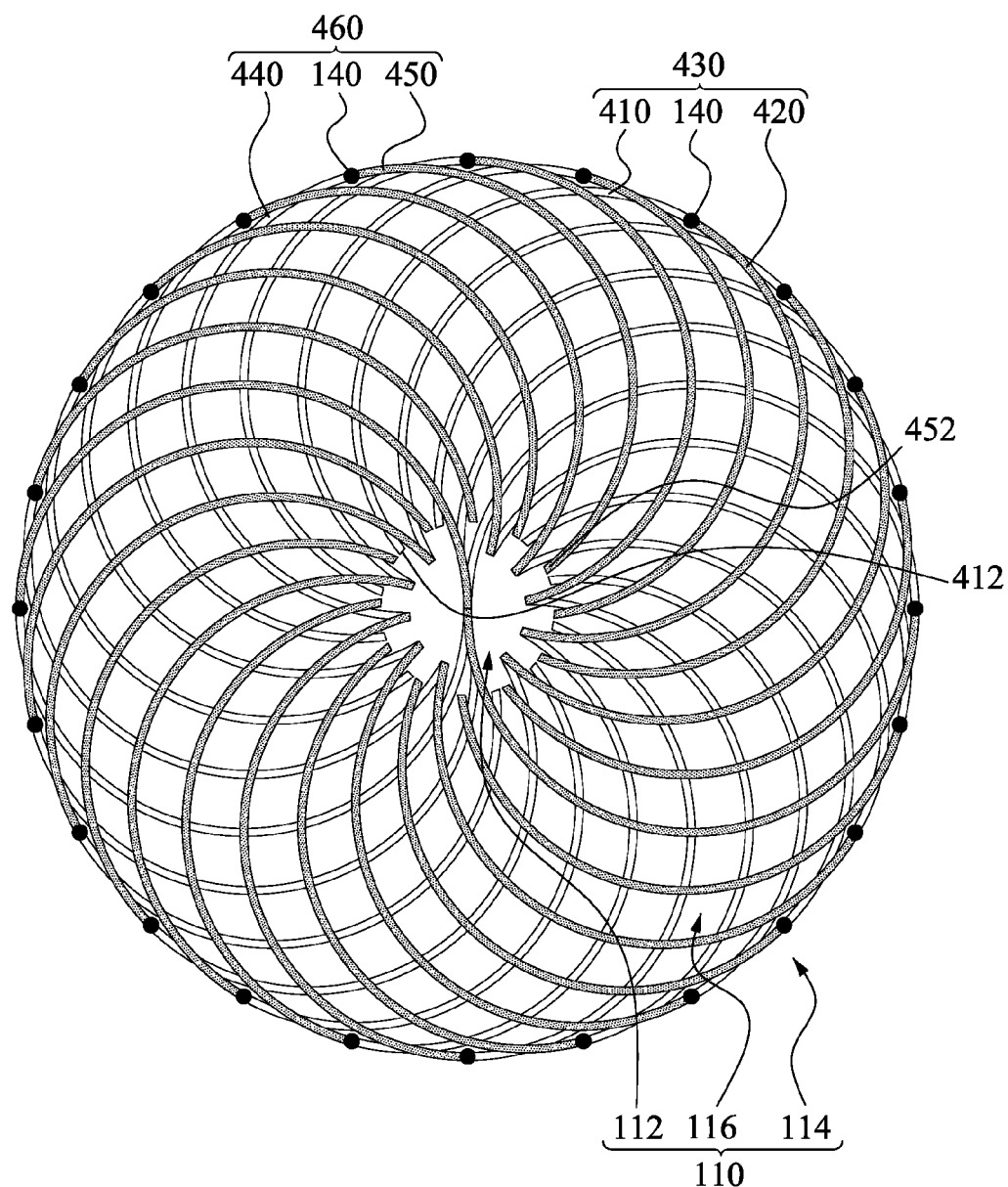
FIG. 8 is a schematic top view of a touch sensing panel according to another implementation of the present invention.

FIG. 8 is a schematic top view of a touch sensing panel 400 according to another implementation of the present invention. As shown in FIG. 8, in multiple implementations, in an arc circuit group 430, the length of a first curved circuit 410 is less than the length of a second curved circuit 420. In an arc circuit group 460, the length of a first curved circuit 440 is greater than the length of a second curved circuit 450. In this way, a part of the second curved circuit 420 and the first curved circuit 440, and the first curved circuit 410 and the second curved circuit 450 may not be overlapped in a central region 112, for example, a first end 412 of the first curved circuit 410 and a third end 452 of the second curved circuit 450. In multiple implementations, the length of the first curved circuit 410 in the arc circuit group 430 and the length of the second curved circuit 450 in the arc circuit group 460 may be essentially the same. In other words, the lengths of the first curved circuits 410 and 440 and the lengths of the second curved circuits 420 and 450 may be partly the same or different.

The part of the second curved circuit 420 and the part of the first curved circuit 440, and the part of the first curved circuit 410 and the part of the second curved circuit 450 in the central region 112 are not overlapped. Density of overlapped parts between the arc circuit groups 430 and 460 of the touch sensing panel 400 is reduced in the central region 112. In this way, when the arc circuit groups 430 and 460 serve as sensing electrodes (Rx) to receive a sensing signal, cases in which electrical features of multiple arc circuit groups 430 and 460 are changed because a touch point of a user is adjacent to too many arc circuit groups 430 and 460 may be reduced. Further, cases in which the touch point of the user is mis-determined may be reduced or avoided. In addition, a change of lengths of the first curved circuits 410 and 440 and lengths of the second curved circuits 420 and 450 may enable capacitance that changes with a touch of the user to have more gradients. In this way, more touch information of the user may be obtained, for example, a pressure of the touch and a force-applying direction of the touch, but the present invention is not limited thereto.

Figure 9:
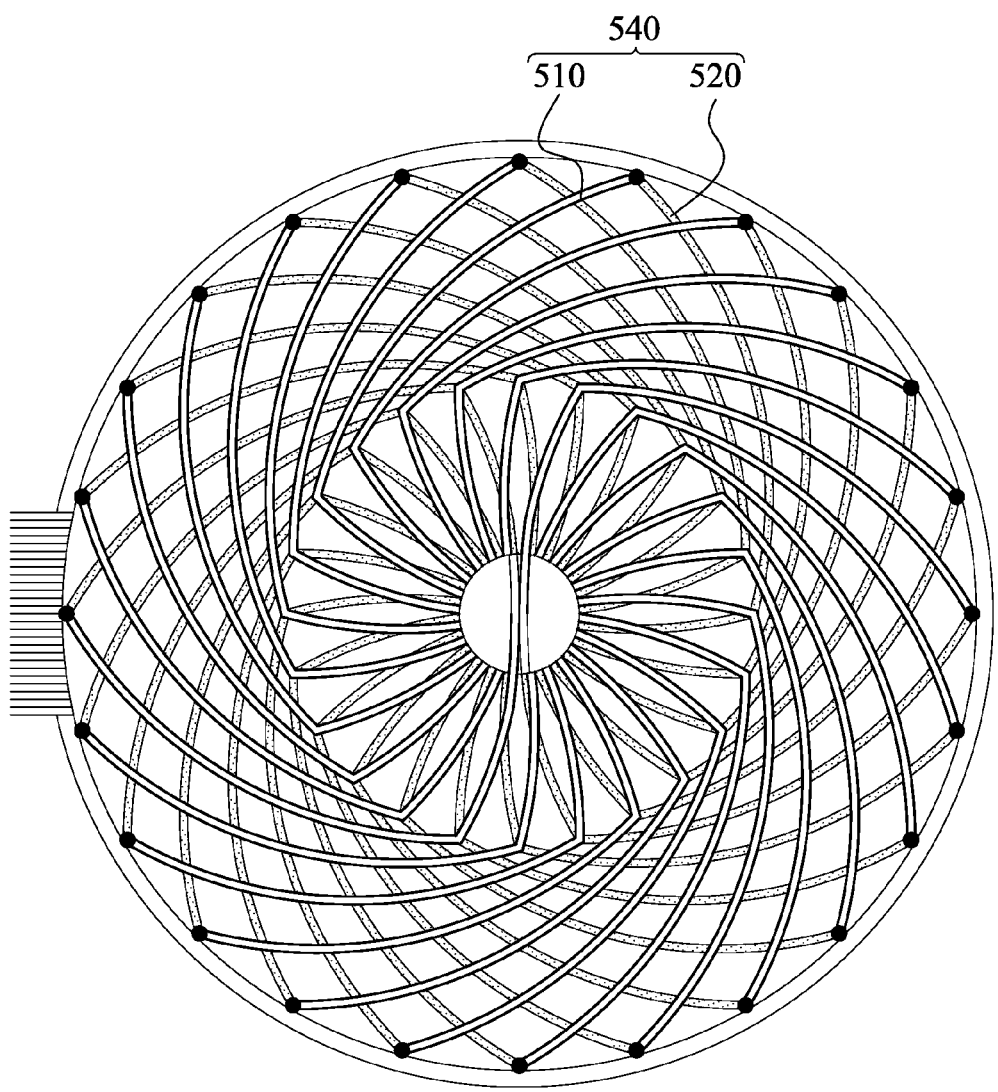
FIG. 9 is a schematic top view of a touch sensing panel according to another implementation of the present invention.

FIG. 9 is a schematic top view of a touch sensing panel 500 according to another implementation of the present invention. As shown in FIG. 9, the touch sensing panel 500 includes the first curved circuits 510 and the second curved circuits 520. Shapes of the first curved circuits 510 and shapes of the second curved circuits 520 may be a part of a Reuleaux triangle. Configurations of arc circuit groups 540 formed by the first curved circuits 510 and the second curved circuits 520 may be at least a part of a single Reuleaux triangle. In multiple implementations, the shapes of the first curved circuits 510 and the shapes of the second curved circuits 520 may be a part of a Reuleaux polygon.

The shapes of the first curved circuits 510 and the second curved circuits 520 of the touch sensing panel 500 are Reuleaux polygons, so that a configuration of an edge of the touch sensing panel 500 may be more flexible. For example, a configuration of the edge of the touch sensing panel 500 may be zigzag shaped. In addition, the Reuleaux polygon geometrically has property very similar to that of a circle. Therefore, after the circle is replaced by the Reuleaux polygon, the touch sensing panel 500 may still work normally.

Figure 10A:
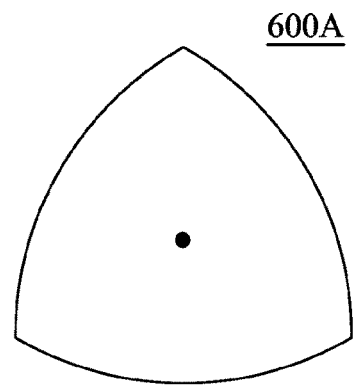
FIG. 10A to FIG. 10D are respectively schematic diagrams of multiple different configurations of first curved circuits or second curved circuits of the touch sensing panel in FIG. 9 according to multiple different implementations of the present invention.
Figure 10B:
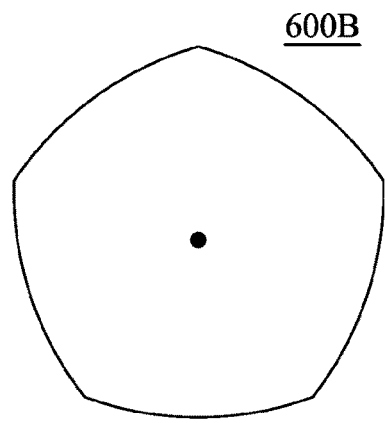
Figure 10C:
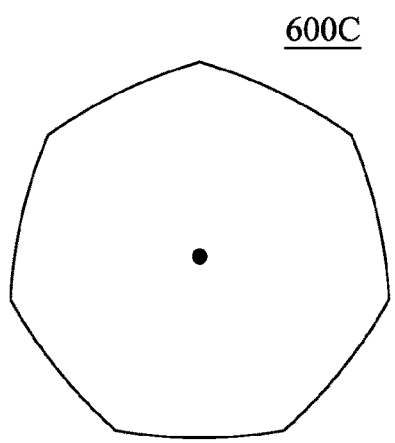
Figure 10D:
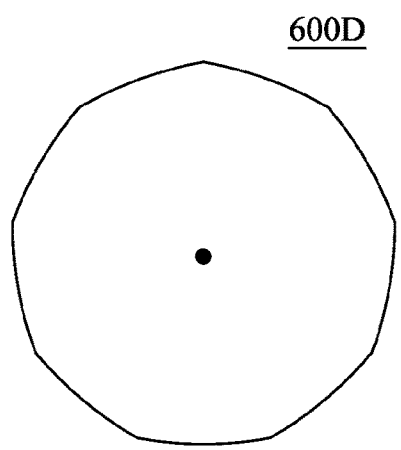

FIG. 10A to FIG. 10D are schematic diagrams of multiple different configurations of first curved circuits 510 or second curved circuits 520 of the touch sensing panel 500 in FIG. 9 according to multiple different implementations of the present invention. As shown in FIG. 10A, shapes of the first curved circuits 510 and shapes of the second curved circuits 520 may be a part of an outline of a Reuleaux triangle 600A. As shown in FIG. 10B, shapes of the first curved circuits 510 and shapes of the second curved circuits 520 may be a part of an outline of a Reuleaux pentagon 600B. As shown in FIG. 10C, shapes of the first curved circuits 510 and shapes of the second curved circuits 520 may be a part of an outline of a Reuleaux heptagon 600C. As shown in FIG. 10D, shapes of the first curved circuits 510 and shapes of the second curved circuits 520 may be a part of an outline of a Reuleaux nonagon 600D.

It should be noted that the arc circuit groups 160, the arc circuit groups 430 and 460, the arc circuit group 540, and the like that are described above are merely examples, and are not intended to limit the present invention. For example, in another implementation, the outline of the arc circuit group may be at least a part of an ellipse. For example, in another implementation, the arc circuit group may be formed by a first curved circuit 120 with an arc shape and a second curved circuit 520 with a shape of a part of a Reuleaux polygon. For example, in another implementation, the arc circuit group may be formed by a first curved circuit 120 with an arc outline and a curved circuit 520 with an outline of a part of an outline of an ellipse. It should be learned that a person of ordinary skill in the technical field of the present invention may make proper modifications and replacements according to an actual need, without departing from the spirit and scope of this disclosure, provided that the arc circuit group is overlapped with other arc circuit groups in a peripheral region of a substrate, and a position where a user touches the substrate may be sensed.

Figure 11:
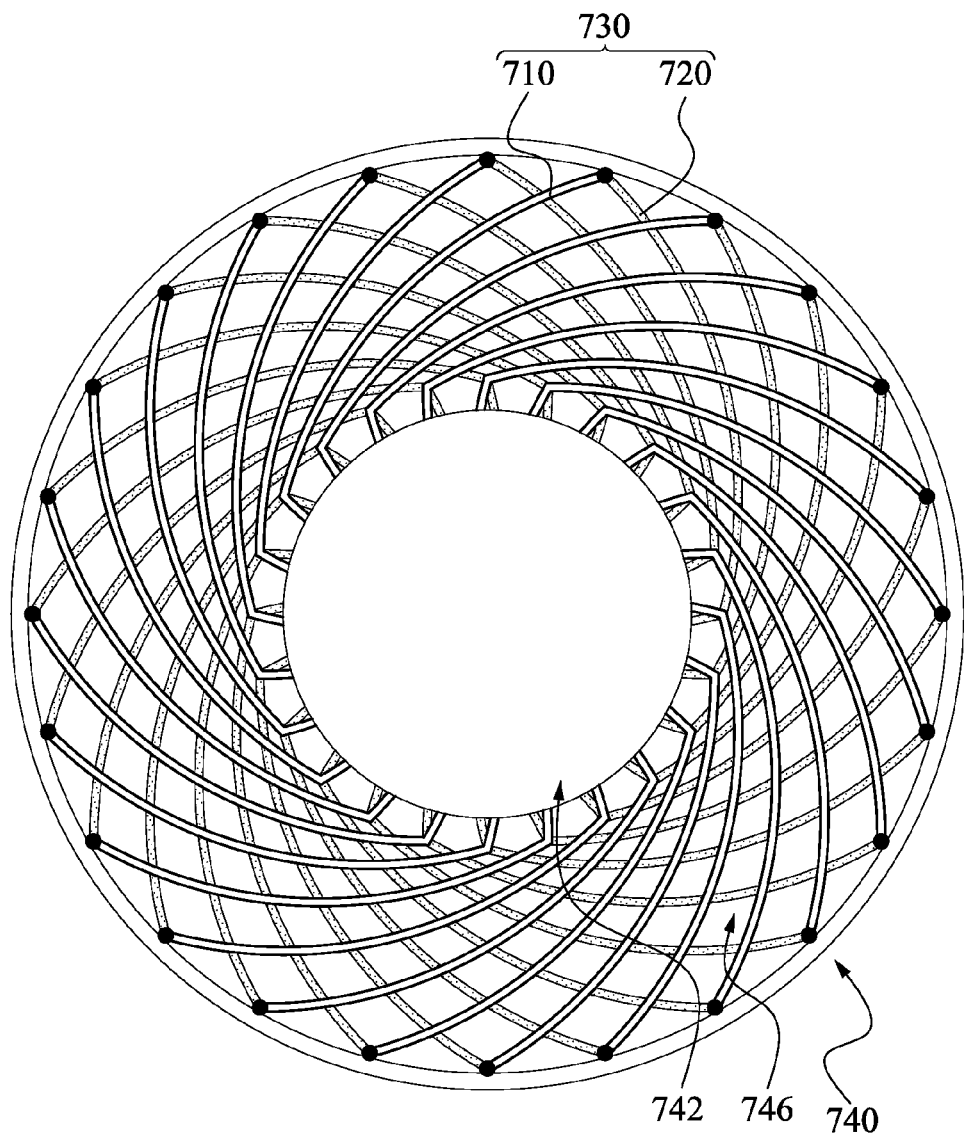
FIG. 11 is a schematic top view of a touch sensing panel according to other multiple implementations of the present invention.

FIG. 11 is a schematic top view of a touch sensing panel 700 according to another implementation of the present invention. As shown in FIG. 11, in multiple implementations, the touch sensing panel 700 includes first curved circuits 710 and second curved circuits 720. The first curved circuits 710 and the second curved circuits 720 form arc circuit groups 730. The first curved circuits 710 and the second curved circuits 720 are disposed in a touch-sensing circuit region 746 of a substrate 740. That is, there is no first curved circuit 710 and second curved circuit 720 in a central region 742 of the substrate 740.

Figure 12:
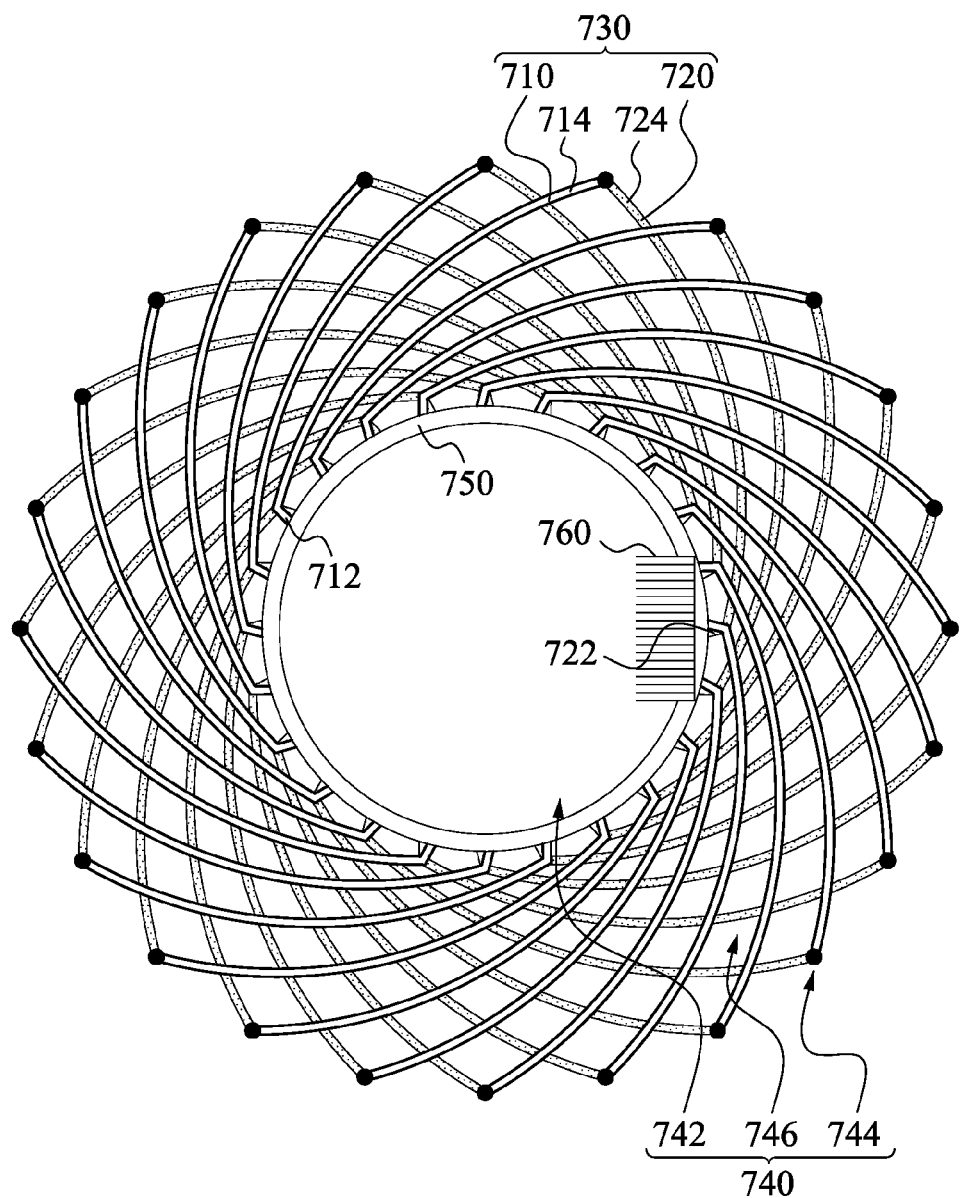
FIG. 12 is a schematic top view of a touch sensing panel according to another implementation of the present invention.

FIG. 12 is a schematic top view of a touch sensing panel 700A according to another implementation of the present invention. As shown in FIG. 12, in this implementation, the touch sensing panel 700A includes first curved circuits 710, second curved circuits 720, and a second ring electrode 750. The first curved circuits 710 and the second curved circuits 720 form arc circuit groups 730. The second ring electrode 750 includes a plurality of lines 760, and a circuit structure thereof is similar to the first ring electrode 340 shown in FIG. 7, and details are not described herein again. The first curved circuit 710 has a first end 712 and a second end 714. The first end 712 is an end of the first curved circuit 710 and is disposed adjacent to a central region 742. The second end 714 is an end of the first curved circuit 710 and is disposed in a peripheral region 744. The second curved circuit 720 has a third end 722 and a fourth end 724. The third end 722 is an end of the second curved circuit 720 and is disposed adjacent to the central region 742. The fourth end 724 is an end of the second curved circuit 720 and is disposed in the peripheral region 744. In this implementation, the second ring electrode 750 is disposed in the central region 742, and the lines 760 in the second ring electrode 750 may be respectively electrically connected to the first ends 712 and the third ends 722 that are adjacent to the central region 742. In this way, the lines 760 may be respectively electrically connected to the first ends 712 of the first curved circuits 710 and the third ends 722 of the second curved circuits 720.

Figure 13:
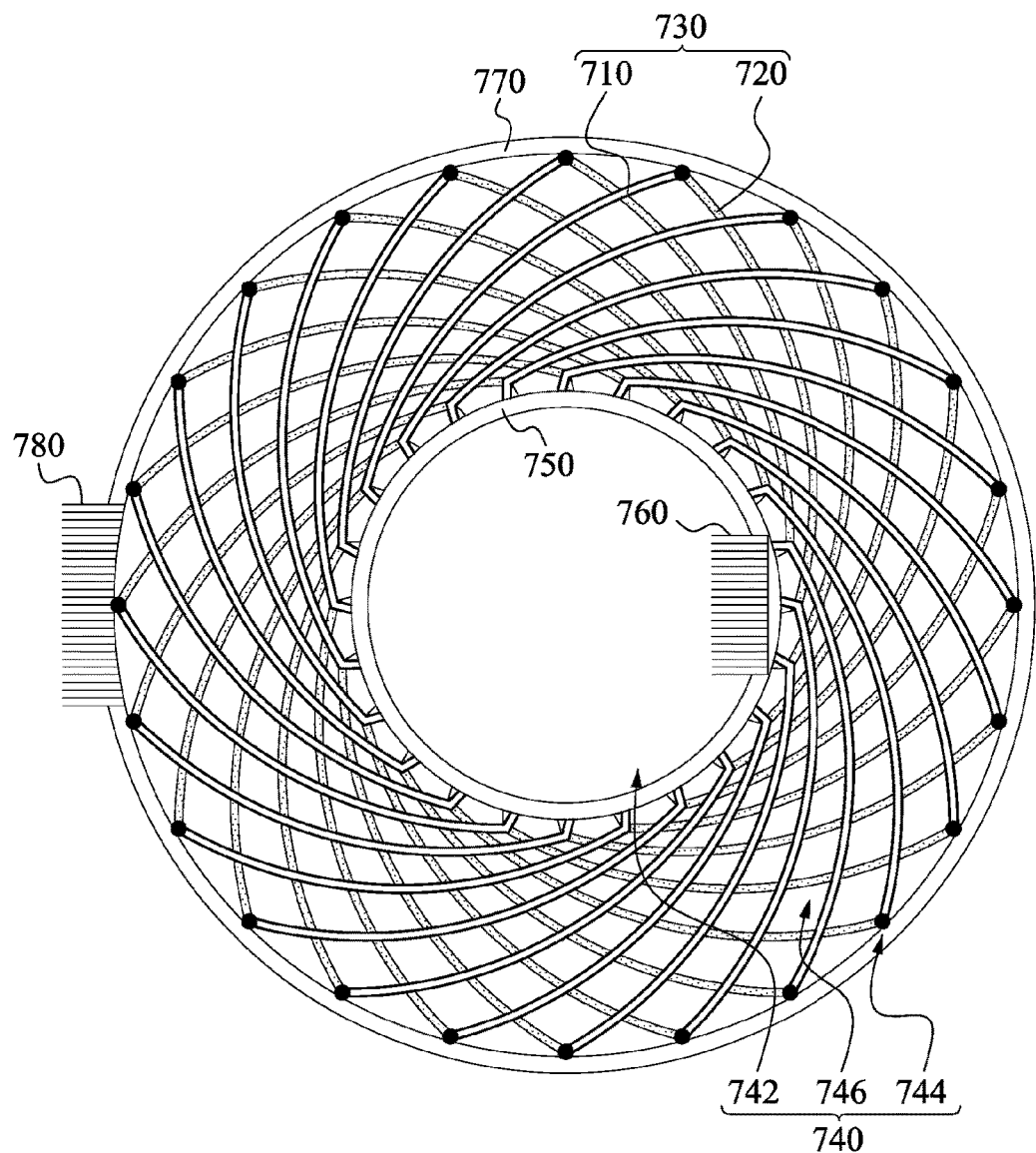
FIG. 13 is a schematic top view of a touch sensing panel according to another implementation of the present invention.

FIG. 13 is a schematic top view of a touch sensing panel 700B according to another implementation of the present invention. As shown in FIG. 13, in this implementation, the touch sensing panel 700B includes first curved circuits 710, second curved circuits 720, a first ring electrode 770, and a second ring electrode 750. The first ring electrode 770 includes a plurality of lines 780, and the second ring electrode 750 includes a plurality of lines 760. Circuit structures of the first ring electrode 770 and the second ring electrode 750 are similar to the circuit structure of the first ring electrode 340 shown in FIG. 7, and details are not described herein again. The first ring electrode 770 is disposed in a peripheral region 744 of the touch sensing panel 700B. The second ring electrode 750 is disposed in a central region 742 of the touch sensing panel 700B. The first curved circuits 710 and the second curved circuits 720 may be electrically connected to the lines 780 in the first ring electrodes 770 and the lines 760 in the second ring electrode 750.

Figure 14:
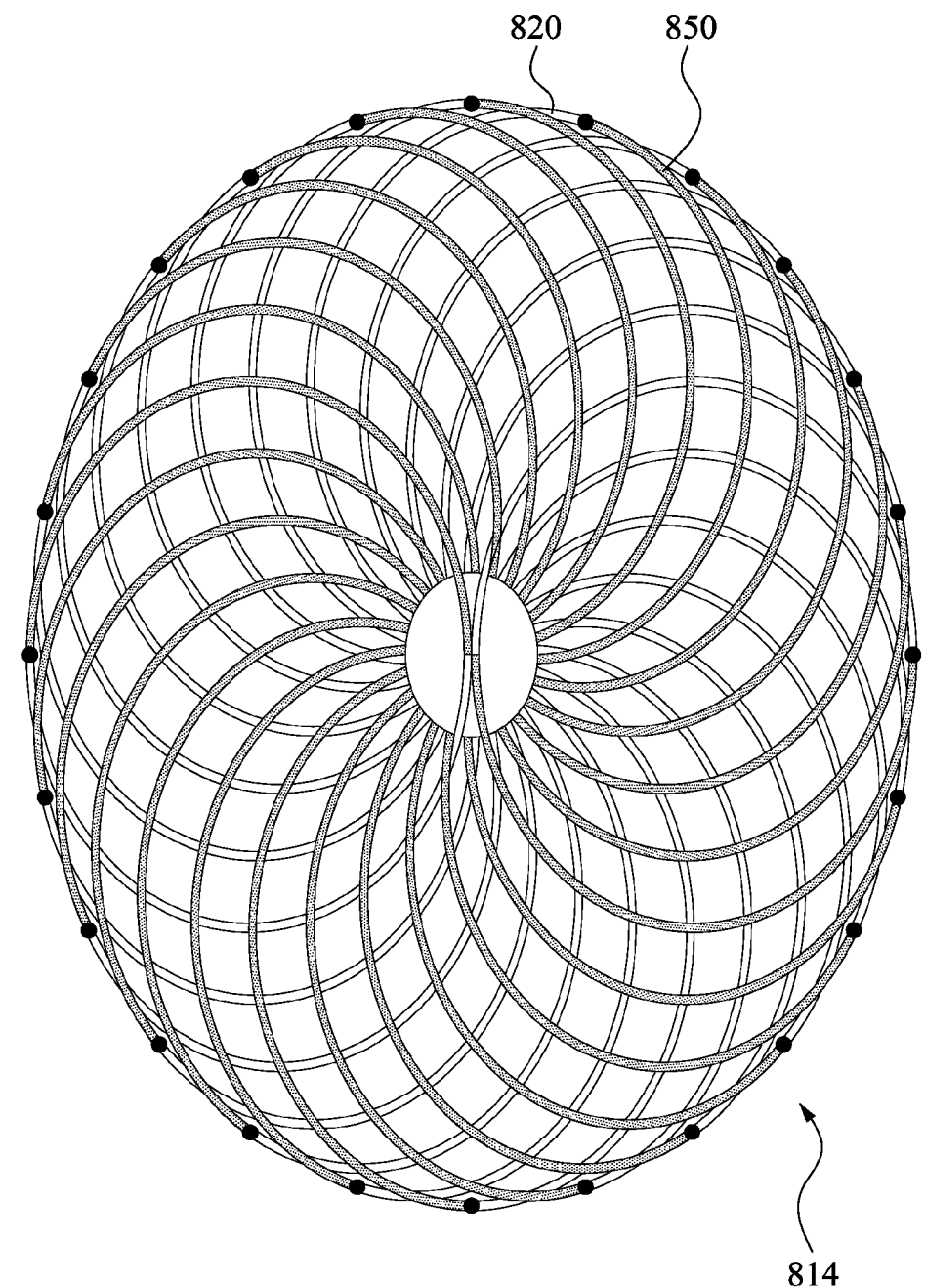
FIG. 14 is a schematic top view of a touch sensing panel according to another implementation of the present invention.

FIG. 14 is a schematic top view of a touch sensing panel 800 according to another implementation of the present invention. As shown in FIG. 14, in this implementation, a configuration of a peripheral region 814 of the touch sensing panel 800 may be ellipse-shaped. First curved circuits 820 and second curved circuits 850 of the touch sensing panel 800 may change with a configuration of the touch sensing panel 800. For example, configurations of the first curved circuits 820 and the second curved circuits 850 may also be at least a part of an ellipse.

In conclusion, the foregoing implementations of the present invention provide a touch sensing panel. First curved circuits and second curved circuits are distributed in a touch-sensing circuit region more efficiently and more regularly by using arc circuits. In addition, density of arc circuits in a central region is reduced, thereby avoiding excessive mutual interference. In addition, in some implementations, in a design of the touch sensing panel in the present invention, the first curved circuits are electrically connected to the second curved circuits by designing through holes, where the first curved circuits and the second curved circuits are respectively disposed on opposite surfaces of an insulation layer, so as to avoid a complex design of lines when a control module is connected, and further reduce, by means of insulation of the insulation layer, interaction interference that is generated when a scanning signal enters an arc circuit. In some implementations, space of the touch sensing panel may be represented by polar coordinates, to locate a touch position of a user, and reduce a calculation amount required by a control chip. Further, power consumption of the touch sensing panel is reduced, and a service life of a battery is prolonged.

The present invention has been disclosed by using implementations, however, the implementations are not intended to limit the present invention, and a person skilled in the art can make various modifications and improvements without departing from the spirit and scope of the present invention. Therefore, the protection scope of the present invention shall be subject to the scope defined by the claims.

What is claimed is:

1. A touch sensing panel, comprising:
a substrate, comprising: a central region, a peripheral region, and a touch-sensing circuit region, wherein the peripheral region surrounds the central region, and the touch-sensing circuit region is between the central region and the peripheral region;
a plurality of first curved circuits, disposed on the substrate, wherein each of the first curved circuits has a first end and a second end, the first end is disposed in the touch-sensing circuit region, and is adjacent to the central region, the second end is disposed in the peripheral region, and a part of each of the first curved circuits that is extended between the first end and the second end is in the touch-sensing circuit region;
a plurality second curved circuits, disposed on the substrate, wherein each of the second curved circuits has a third end and a fourth end, the third end is disposed in the touch-sensing circuit region and is adjacent to the central region, the fourth end is disposed in the peripheral region, and is electrically connected to one of the second ends in the peripheral region, a part of each of the second curved circuits that is extended between the third end and the fourth end is in the touch-sensing circuit region, and a projection of each of the second curved circuits in a direction perpendicular to the substrate is intersected with at least one of the first curved circuits; and
an insulation layer, disposed on the substrate, wherein the insulation layer insulates the first curved circuits and the second curved circuits in the touch-sensing circuit region.

2. The touch sensing panel according to claim 1, wherein the insulation layer is also disposed in the peripheral region, the first curved circuits and the second curved circuits are respectively disposed on two opposite sides of the insulation layer, the insulation layer has a plurality of through holes disposed in the peripheral region, and the second curved circuits are respectively electrically connected to the first curved circuits through the through holes.

3. The touch sensing panel according to claim 2, wherein projections of the second end and the fourth end that are electrically connected through one of the through holes are overlapped in the direction perpendicular to the substrate.

4. The touch sensing panel according to claim 1, wherein each of the first curved circuits has a plurality of first parts and a plurality of second parts, the first parts and the second curved circuits are disposed on one side of the insulation layer, and are not in contact with each other, the second parts are disposed on the other side of the insulation layer, and are respectively connected to the first parts through the insulation layer in the touch-sensing circuit region, and the second parts are in a joint between projections of the first curved circuits and the second curved circuits in the direction perpendicular to the substrate.

5. The touch sensing panel according to claim 1, wherein shapes of the first curved circuits and the second curved circuits comprise one or a combination of an arc shape, an elliptical arc shape, and a part of a Reuleaux polygon.

6. The touch sensing panel according to claim 5, wherein shapes of the first curved circuits and the second curved circuits separately comprise one of an arc shape, an elliptical arc shape, and a part of a Reuleaux polygon.

7. The touch sensing panel according to claim 1, wherein one of the first curved circuits and one of the second curved circuits that are electrically connected are of a mirror symmetrical structure.

8. The touch sensing panel according to claim 1, wherein shapes of the first curved circuits or shapes of the second curved circuits are the same, partly the same, or different.

9. The touch sensing panel according to claim 1, wherein lengths of the first curved circuits and lengths of the second curved circuits are the same, partly the same, or different.

10. The touch sensing panel according to claim 1, further comprising: a first ring electrode, disposed in the peripheral region, and electrically connected to the second ends and the fourth ends.

11. The touch sensing panel according to claim 1, further comprising: a second ring electrode, disposed in the central region, and electrically connected to the first ends and the third ends.

12. The touch sensing panel according to claim 1, wherein materials of the first curved circuits or the second curved circuits comprise transparent conductive materials.

13. The touch sensing panel according to claim 1, wherein materials of the first curved circuits and the second curved circuits are the same, partly the same, or different.

14. The touch sensing panel according to claim 1, wherein the curvature radius of the circumcircle of the first curved circuits is less than or equal to one half of the curvature radius of the peripheral region, and the curvature radius of the circumcircle of the second curved circuits is less than or equal to one half of the curvature radius of the peripheral region.

* * * * *